United States Patent [19]
Hildebrandt et al.

[11] Patent Number: 6,111,056
[45] Date of Patent: Aug. 29, 2000

[54] CYCLIC AMINE BASED POLYMERS AND PROCESS FOR THEIR PRODUCTION

[75] Inventors: Sören Hildebrandt, Speyer; Elisabeth Kappes; Dieter Boeckh, both of Limburgerhof, all of Germany; Rajan Panandiker, West Chester, Ohio; Sherri Randall, Hamilton, Ohio; Eugene Paul Gosselink, Cincinnati, Ohio; William Conrad Wertz, West Harrison, Ind.

[73] Assignee: BASF Aktiengesellschaft, Ludwigshafen, Germany

[21] Appl. No.: 09/153,307

[22] Filed: Sep. 15, 1998

Related U.S. Application Data

[60] Provisional application No. 60/058,931, Sep. 15, 1997.

[51] Int. Cl.$^7$ .......................... C08G 69/00; C08G 12/00; C08F 8/02; C08L 79/02
[52] U.S. Cl. ...................... 528/310; 528/327; 528/329.1; 528/337; 528/220; 528/229; 525/181; 525/192
[58] Field of Search ..................................... 528/310, 327, 528/329.1, 337; 525/181, 192

[56] References Cited

U.S. PATENT DOCUMENTS

| | | |
|---|---|---|
| 3,864,317 | 2/1975 | Ogata et al. . |
| 3,910,862 | 10/1975 | Barabas et al. . |

FOREIGN PATENT DOCUMENTS

| | | |
|---|---|---|
| 0209787 | 7/1986 | European Pat. Off. . |
| WO 98/17762 | 10/1997 | WIPO . |

*Primary Examiner*—P. Hampton-Hightower
*Attorney, Agent, or Firm*—Oblon, Spivak, McClelland, Maier & Neustadt, P.C.

[57] ABSTRACT

A cyclic amine containing polymer substantially free of primary and secondary amino groups which is prepared by reacting:

a) an amine selected from the group consisting of:
   i) cyclic amines having at least one nitrogen atom in the ring and at least one primary amino alkyl group bonded to the nitrogen atom of the ring, and
   ii) mixtures of cyclic amines containing at least two nitrogen atoms which react with a cross-linking agent with at least one other amine containing 1–6 nitrogen atoms which react with a cross-linking agent, with b) at least one cross-linker selected from the group consisting of at least one compound containing two groups which react with the primary amino group and said nitrogen atoms and mixtures of at least one compound containing two groups which react with the primary amino group and said nitrogen atoms with at least one compound containing at least three groups which react with the primary amino group and said nitrogen atoms in a molar ratio of (a):(b) of from 2.5:1 to 1:1.5 thereby forming a cyclic amine containing polymer containing primary or secondary amino groups and reacting said cyclic amine based polymer, with c) an alkylating agent selected from the group consisting of epoxides, alkyl halides, arylalkyl halides, dimethyl sulfate, diethyl sulfate, mixtures of formic acid and an aldehyde, and mixtures of formic acid and a ketone, to convert more than 80% of the primary and secondary nitrogen groups into tertiary nitrogen groups.

16 Claims, No Drawings

CYCLIC AMINE BASED POLYMERS AND PROCESS FOR THEIR PRODUCTION

Under Title 35 U.S.C. 119 (e), this Application claims the benefit of Provisional Application Ser. No. 60/058,931, filed Sep. 15, 1997.

BACKGROUND OF THE INVENTION

1. Field of the Invention

The present invention relates to cyclic amine based polymers which are substantially free of primary and secondary amino groups and a process for their production.

2. Background of the Invention

EP-B-0,209,787 relates to a process for the aftertreatment of dyeings with reactive dyes on cellulose fiber materials with an aqueous solution of condensates which are obtained by first reacting piperazine, bis-1,4-aminopropylpiperazine, 1-aminoethylpiperazine, 2-hydroxyethylpiperazine or 1-methylpiperazine or mixtures thereof with a crosslinking agent selected from ethylene chloride, epihalohydrin, propylene chloride, 1,3-dichloro-2-hydroxypropane, bisepoxybutane, 1,4-dichlorobutane or a mixture thereof, in a molar ratio of from 1:0.5 to 1:1.1 and then benzylating the condensation products to such an extent that 15 to 90% of the tertiary nitrogen atoms in the condensation products are quaternized.

The use of polycationic condensates as color transfer inhibiting and color release reducing additive to detergents and to fabric conditioners is known from WO-A-98/17762. These water-soluble polycationic condensates are obtained by condensing for instance piperazine, alkylpiperazines, 1,4-bis-(3-aminopropyl)piperazine, imidazole, alkylimidazoles or their mixtures with a crosslinking agent selected from alkylene dihalides, epihalohydrins and/or bisepoxides. At least 25%, preferably at least 50% of the amino groups of the condensation products may be quaternized.

The cationic condensation products described above have color-fixing properties and more or less additionally fix soil from the wash liquor on the textile material during the wash. Moreover, many of the said cationic condensation products are not stable in detergents which contain a bleaching agent. It is therefore the object of the invention to provide new cationic polymers which are stable against bleaching agents containing detergents and which have a better wash performance.

We have found that this objective is achieved with a cyclic amine based polymer substantially free of primary and secondary amino groups wherein the said polymer is prepared by reacting a) an amine selected from the group consisting of cyclic amines having at least one nitrogen atom in the ring and at least one primary aminoalkyl group attached to the nitrogen atom of the ring and
  mixtures of cyclic amines containing at least two reactive nitrogen atoms with at least one other amine containing 1 to 6 nitrogen atoms with b) at least one crosslinker selected from the group consisting of at least one compound containing two reactive groups and mixtures of at least one compound containing two reactive groups with at least one compound containing at least three reactive groups in a molar ratio of (a):(b) of from 2.5:1 to 1:1.5 with formation of cyclic amine based polymer containing primary or secondary amino groups and reacting the said cyclic amine based polymer with (c) an alkylating agent selected from the group consisting of epoxides, alkyl halides, arylalkyl halides, dimethyl sulfate, diethyl sulfate, mixtures of formic acid and an aldehyde, and mixtures of formic acid and a ketone, to convert more than 80% of the primary and secondary nitrogen groups into tertiary nitrogen groups.

The above objective is also achieved with a cyclic amine based polymer substantially free of primary and secondary amino groups, wherein the said polymer is obtainable by reacting (a) a cyclic amine having at least two reactive nitrogen atoms with (b) a mixtures of crosslinkers of at least one compound containing two reactive groups with at least one compound containing at least three reactive groups in a molar ratio of (a):(b) of from 2.5:1 to 1:1.5 with formation of water-soluble cyclic amine based polymer substantially free of primary and secondary amino groups. The preferred compounds of this embodiment of the invention are obtainable by reacting (a) imidazole with (b) a mixture of epichlorohydin and the triglycidyl ether of trimethylolpropane or a mixture of epichlorohydrin and the triglycidyl ether of pentaerythritol.

Suitable compounds of group (a) that can be used alone or in mixture with other amines are cyclic amines having at least one nitrogen atom in the ring and at least one primary aminoalkyl group attached to the nitrogen atom of the ring. Such compounds are for example monoaminoalkylpiperazines, bis(aminoalkyl)piperazines, monoaminoalkylimidazoles, aminoalkylmorpholines, aminoalkylpiperidines and aminoalkylpyrrolidines. The monoaminoalkylpiperazines are for example 1-(2-aminoethyl)piperazine and 1-(3-aminopropyl)piperazine. Preferred monoaminoalkylimidazoles have 2 to 8 carbons atoms in the alkyl group. Examples of suitable compounds are 1-(2-aminoethyl)imidazole and 1-(3-aminopropyl)imidazole that. Suitable bis(aminoalkyl)piperazines are for example 1,4-bis (-2-aminoethyl)piperazine and 1,4-bis(3-aminopropyl)-piperazine. Preferred aminoalkylmorpholines are aminoethylmorpholine and 4-(3-aminopropyl)-morpholine. Other preferred compounds of this group are aminoethylpiperidine, aminopropylpiperidine and aminopropylpyrrolidine.

Cyclic amines with at least two reactive nitrogen atoms that are used in mixture with at least one other amine are for example imidazole, C-alkyl substituted imidazoles having 1 to 25 carbon atoms in the alkyl group such as 2-methylimidazole, 2-ethylimidazole, 2-propylimidazole, 2-isopropylimidazole and 2-isobutylimidazole, imidazoline, C-alkyl substituted imidazolines having 1 to 25 carbon atoms in the alkyl group and arylimidazolines such as 2-phenylimidazoline and 2-tolylimidazoline, piperazine, N-alkyl-piperazines having 1 to 25 carbon atoms in the alkyl group such as 1-ethylpiperazine, 1-(2-hydroxy-1-ethyl) piperazine, 1-(2-hydroxy-1-propyl)piperazine, 1-(2-hydroxy-1-butyl)piperazine, 1-(2-hydroxy-1-pentyl)piperazine, 1-(2,3-dihydroxy-1-propyl)piperazine, 1-(2-hydroxy-3-phenoxyethyl)piperazine, 1-(2-hydroxy-2-phenyl-1-ethyl) piperazine,
N,N'-dialkylpiperazines having 1 to 25 carbon atoms in the alkyl group for example 1,4-dimethylpiperazine, 1,4-diethylpiperazine, 1,4-dipropylpiperazine, 1,4-dibenzylpiperazine, 1,4-bis(2-hydroxy-1-ethyl)piperazine, 1,4-bis(2-hydroxy-1-propyl)piperazine, 1,4-bis(2-hydroxy-1-butyl)piperazine, 1,4-bis(2-hydroxy-1-pentyl)piperazine, and 1,4-bis(2-hydroxy-2-phenyl-1-ethyl)piperazine. Other cyclic amines with at least two reactive nitrogen atoms are benzimidazoles such as 2-hydroxybenzimidazole and 2-aminobenzimidazole. Melamine is another example of a compound of group (a).

Preferred cyclic amines with at least two reactive nitrogen atoms are imidazole, 2-methylimidazole, 4-methylimidazole and piperazine.

The cyclic amines with at least two reactive nitrogen atoms are used in mixture with at least one other amine containing 1 to 6 nitrogen atoms of which at least one is not quaternary. Examples of such amines are linear alkyl amines having 1 to 22 carbon atoms in the alkyl group, branched alkylamines, cycloalkylamines, alkoxyamines, amino alcohols, cyclic amines containing one nitrogen atom in a ring structure, alkylenediamines, polyether diamines, and polyalkylenepolyamines containing 3 to 6 nitrogen atoms.

Specific examples of the said amines are methylamine, ethylamine, propylamine, butylamine, pentylamine, hexylamine, heptylamine, octylamine, 2-ethylhexylamine, isooctylamine, nonylamine, isononylamine, decylamine, undecylamine, dodecylaminetridecylamine, stearylamine, palmitylamine, dimethylamine, diethylamine, dipropylamine, dibutylamine, dipentylamine, dihexylamine, bis-(2-ethyl-hexyl)amine, ditridecylamine, N-methylbutylamine, N-ethylbutylamine, piperidine, morpholine, pyrrolidine, 2-methoxyethylamine, 2-ethoxyethylamine, 3-methoxypropylamine, 3-ethoxypropylamine, 3-[(2-ethylhexyl)oxy]-1-propaneamine, 3-[(2-methoxyethoxy]-1-propaneamine, 2-methoxy-N-(2-methoxyethyl)ethanamine, 2-aminoethanol, 3-amino-1-propanol, 1-amino-2-propanol, 2-(2-aminoethoxy)ethanol, 2-[(2-aminoethyl)amino]ethanol, 2-(methylamino)ethanol, 2-(ethylamino)ethenol, 2-(butylamino)ethanol, diethanolamine, 3-[(2-hydroxyethyl)amino] 1-propanol, diisopropanolamine, bis-(2-hydroxyethyl)aminoethylamine, bis-(2-hydroxypropyl)aminoethylamine, bis-(2-hydroxyethyl)aminopropylamine, bis-(2-hydroxypropyl)aminopropylamine, cyclopentylamine, cyclohexylamine, N-methylcyclohexylamine, N-ethylcyclohexylamine, dicyclohexylamine, ethylenediamine, propylenediamine, butylenediamine, neopentyldiamine, hexamethylenediamine, octamethylenediamine, isophoronediamine, 4,4,-methylene-biscyclohexylamine, 4,4'-methylenebis(2-methylcyclohexylamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino)propylamine, 3-(cyclohexylamino)propylamine, 3-aminopropylamine, 2-(diethylamino)ethylamine, 3-(dimethylamino)propylamine, 3-(diethylamino)propylamine, dipropylenetriamine, tripropylenetetramine, N,N-bis-(aminopropyl)methylamine, N,N-bis-(aminopropyl)ethylamine, N,N-bis-(aminopropyl)hexylamine, N,N-bis-(aminopropyl)octylamine, 1,1-dimethyldipropylenetriamine, N,N-bis-(3-dimethylaminopropyl)amine, N,N"-1,2-ethanediyl-bis-(1,3-propanediamine), diethylenetriamine, bis-(aminoethyl) ethylenediamine, bis-(aminopropyl)ethylenediamine, bis-(hexamethylene)triamine, N-(aminoethyl) hexamethylenediamine, N-(aminopropyl) hexamethylenediamine, N-(aminopropyl) ethylenediamine, N-(aminoethyl)butylenediamine, N-(aminopropyl) butylenediamine, bis-(aminoethyl)hexamethylenediamine, bis-(aminopropyl)hexamethylenediamine, bis-(aminoethyl)butylenediamine, bis-aminopropyl)butylenediamine, 4-aminomethyloctane-1,8-diamine, and N,N-diethyl-1,4-pentanediamine.

Preferred amines that are used in mixture with at least one cyclic amine with at least two reactive nitrogen atoms are methylamine, ethylamine, propylamine, ethylenediamine, 1,4-diaminobutane, 1,2-diaminobutene, 1,3-diaminopropane, 1,2-diaminopropane, hexamethylenediamine, bishexamethylenetriamine, diethylenetriamine, dipropylenetriamine, triethylentetramine, tetraethylenepentamine, dimethylaminopropylamine and N,N-bis(3-aminopropyl)-N-methylamine.

Most preferred amines that are used in mixture with at least one cyclic amine with at least two reactive nitrogen atoms are ethylenediamine, 1,3-diaminopropane, hexamethylenediamine, dimethylaminopropylamine and N,N-bis(3-aminopropyl)-N-methylamine.

The term "reactive nitrogen atom" means that this nitrogen atom is capable of reacting with for example an alkylating agent, e.g. benzyl chloride, or with a crosslinker, e.g. ethylene chloride or epichlorohydrin and excludes quaternary nitrogen atoms which cannot react further. In accordance with the said meaning primary, secondary and tertiary amino groups contain one reactive nitrogen atom, whereas imidazole contains two.

The amines of group (a) are reacted with at least one crosslinker. The crosslinker based on compounds containing two reactive groups is selected from the group consisting of alkylene dihalides, epihalohydrins, bis(halohydrins) of diols, bis(halohydrins) of polytetrahydrofuran, bisepoxides. Examples of alkylene dihalides which may have 2 to 6 carbon atoms in the alkylene group are 1,2-dichloroethane, 1,2-dichloropropane, 1,3-dichloropropane, 1,4-dichlorobutane, 1,6-dichlorohexane, 1,3-dichloropropane-2ol, 1,2-dichloropropane-3-ol. Epihalohydrins are epichlorohydrin, epibromohydrin and epi-iodohydrin. Bis(halohydrins) of diols are for example derived from alkylene glycols and polyalkylene glycols, e.g. bis(chlorohydrins) of ethylene glycol, polyethylene glycol containing 2 to 100 ethylene oxide units, propylene glycol, polypropylene glycol containing 2 to 70 propylene oxide units, 1,2-butanediol, 1,4-butanediol, 1,2-pentanediol, 1,5-pentanediol, 1,2-hexanediol, 1,6-hexanediol, 2,2-dimethyl-1,3-propanediol, bis(hydroxyphenyl)methane, 2,2-bis(hydroxyphenyl) propane and polytetrahydrofurans having 2 to 50 tetrahydrofuran units.

The bis(halohydrins) can be converted into bisepoxides via dehydrohalogenation by treatment with a base such as sodium hydroxide or potassium hydroxide. Another suitable bisepoxide is bisepoxybutane.

Crosslinkers which contain at least three reactive groups are for example C3- to C10-alkylene trihalides, reaction products of polyols having at least three hydroxy groups with epihalohydrins in a molar ratio of at least 1:3 or their dehydrohalogenation products. Polyols with at least three hydroxy groups are for example glycerol, pentaerythritol, sorbitol, and trimethylolpropane. Dehydrohalogenation products are e.g. poly-[(phenyl-2,3-epoxypropylether)-co-formaldehyde (=epoxi-phenol-novolak with CAS-No. 39362-23-7 und 28064-14-4), poly-{2,2-[4,4'-bis-(2,3-epoxyprpopyloxyphenyl)propane]}-co-formaldehyde (=epoxi-bis-A-novolak), bis-{4-[bis-(2,3-epoxypropyl)amino]phenyl}methane (with CAS-No. 28768-32-3), and 1,3,5-tris-(2,3-epoxypropyl)1,3,5-triazin-1H,3H,5H,2,4,6-trion (=isocyanuric acid-(2,3-epoxypropyl)-ester, CAS-No. 2451-62-9). The molecular weight of the crosslinkers usually does not exceed 3000 and is preferably in the range of from 92 to 2000.

Preferred cyclic amine based polymers contain in condensed form as crosslinker with at least three reactive groups C3- to C10-alkylene trihalides or reaction products of polyols having three to six hydroxy groups with epihalohydrins in a molar ratio of at least 1:3. The most preferred crosslinkers are epichlorohydrin, the triglycidyl ether of trimethylolpropane, the triglycidyl ether of pentaerythritol, and mixtures thereof.

The compounds of groups (a) and (b) are reacted in a molar ratio ot (a):(b) of from 2.5:1 to 1:1.5 with the formation of cyclic mine based polymers which contain primary and secondary amino groups. The reaction is preferably carried out in a solvent at temperatures of from 20 to 120° C. If the reaction temperature is above the boiling point of the solvent, then the reaction is carried out in a pressure-tight apparatus under elevated pressure. Suitable solvents are alcohols, e.g. methanol, ethanol, n-propanol, isopropanol and butanols, ethers such as dimethyl glycols or tetrahydrofuran, and water, which is the preferred solvent.

The reaction of the primary and secondary amino groups containing cyclic amine based polymers with the alkylating agents (c) is preferably carried out in a solvent at temperatures from 20–180° C. In case of gaseous alkylating agents like e.g. ethylene oxide and propylene oxide the reaction is carried out in an autoclave under elevated pressure. The pressure applied can be varied in a broad range and is typically in the range of from 1–50 bar, preferably 1.5–20 bar. Suitable solvents are alcohols, e.g. methanol, ethanol, n-propanol, isopropanol and butanols, ethers such as dim-ethyl glycols or tetrahydrofuran, and water, which is the preferred solvent.

In order to convert the primary and secondary amino groups of the cyclic amine based polymers to tertiary amino groups without quaternization the amount of alkylating agent (c) is preferably less then 1,1 times, most preferred less then 1,0 times the molar amount of the N—H bonds in the polymer if a alkylating agent is used, that is capable of alkylating tertiary amines under the applied conditions.

One mole of a crosslinker with two reactive groups (e.g. epichlorohydrin) corresponds to two moles of epoxide equivalents and one mole of crosslinker with -three reactive groups (e.g. trimethylolpropane triglycidyl ether) corresponds to three moles of epoxide equivalents. The mixture of crosslinkers which contain at least one crosslinker with two reactive groups (e.g. two epoxide groups) and at least one crosslinker with at least three reactive groups (e.g. at least three epoxide groups) contains 1 to 30, preferably 2 to 20 and most preferred 5 to 10 mol % of the crosslinker with at least three reactive groups.

Preferred cyclic amine based polymers are obtained by reacting
(a) a cyclic amine having at least two reactive nitrogen atoms in the molecule with
(b) a mixture of crosslinkers of at least one compound containing two groups which react with a compound having a non-quaternary nitrogen atom and at least one compound containing at least three groups which react with a compound having a non-quaternary nitrogen atom
directly form water-soluble cyclic amine based polymers which are substantially free or primary and secondary amino groups.

Most preferred are polymers which are obtained by reacting
(a) imidazole with
(b) a mixture of 85 to 98 mol % of epichlorohydrin and 2 to 15 mol % of the triglycidyl ether of trimethylol propane or of the triglycidyl ether of pentaerythritol.

Condensation products of the compounds of groups (a) and (b) which still contain primary and/or secondary amino groups are further reacted with (c) an alkylating agent selected from the group consisting of epoxides, alkyl halides, arylalkyl halides, dimethyl sulfate, diethyl sulfate, mixtures of formic acid and an aldehyde, and mixtures of formic acid and a ketone, to convert more than 80% of the primary and secondary nitrogen groups into tertiary nitrogen groups. In a preferred embodiment of the invention more than 90% of the primary and secondary nitrogen groups of the condensation product of (a) and (b) are converted into tertiary nitrogen groups by reacting them with (c) an alkylating agent selected from the group consisting of ethylene oxide, propylene oxide, C1- to C3- alkyl halide, dimethyl sulfate, diethyl sulfate, and a mixture of formic acid and a C1- to C3- aldehyde. Cyclic amine based polymers wherein more than 90% of the primary and secondary nitrogen groups of the condensation product of (a) and (b) are converted into tertiary nitrogen groups by reacting them with (c) ethyleneoxide, propyleneoxide and/or a mixture of formic acid and formaldehyde are most preferred. Such products are for example obtained by reacting
(a) 1,4-bis(aminopropyl)piperazine or a mixture of imidazole with at least one compound selected from the group consisting of dimethylamino propylamine, hexamethylenediamine, ethylenediamine, 1,3-diaminopropane and N,N-bis(3-aminopropyl)-N-methylamine with
(b) epichloroydrin in a molar ratio of from 2.0:1 to1:1 with formation of a water-soluble cyclic amine based polymer containing primary or secondary amino groups and
(c) alkylating the said cyclic amine based polymer with ethylene oxide, propylene oxide and/or a mixture of formic acid and formaldehyde to convert more than 95% or the primary and secondary amino groups into tertiary nitrogen groups.

The cyclic amine based polymers which are substantially free of primary and secondary amino groups are produced by reacting
(a) an amine selected from the group consisting of (i) cyclic amines having at least one nitrogen atom in the ring and at least one primary aminoalkyl group attached to the nitrogen atom of the ring and (ii) mixtures of cyclic amines containing at least two reactive nitrogen atoms with at least one other amine containing 1 to 6 nitrogen atoms with
(b) at leant one crosslinker selected from the group consisting of at least one compound containing two reactive groups and mixtures of at least one compound containing two reactive groups with at least one compound containing at least three reactive groups
in a molar ratio of (a):(b) of from 2.5:1 to 1:1.5 with formation of a cyclic amine based polymer containing primary or secondary amino groups and reacting the said cyclic amine based polymer with
(c) an alkylating agent selected from the group consisting of epoxides, alkyl halides, arylalkyl halides, dimethyl sulfate, diethyl sulfate, mixtures of formic acid and an aldehyde, and mixtures of formic acid and a ketone, to convert more than 80% of the primary and secondary nitrogen groups into tertiary nitrogen groups.

Cyclic amine based polymer substantially free of primary and secondary amino groups are also produced by reacting
(a) a cyclic amine havng at least two reactive nitrogen atoms with
(b) a mixtures of crosslinkers of at least one compound containing two reactive groups with at least one compound containing at least three reactive groups
in a molar ratio of (a):(b) of from 2.5:1 to 1:1.5. Water-soluble cyclic amine based polymers which are substantianlly free of primary and secondary amino groups are obtained.

Suitable amines of component (a), crosslinkers (b) and alkylating agents (c) are specified above. According to a preferred embodiment of the invention more than 90% of the primary and secondary nitrogen groups of the condensation product of (a) and (b) are converted into tertiary nitrogen groups by reacting them with (c) an alkylating agent selected from the group consisting of ethylene oxide, propylene oxide, C1- to C3- alkyl halide, dimethyl sulfate, diethyl sulfate, and a mixture of formic acid and a C1- to C3- aldehyde.

According to a preferred embodiment of the invention (a) 1,4-bis(aminopropyl)piperazine or a mixture of imidazole with at least one compound selected from the group consisting of dimethylamino propylamine, hexamethylenediamine and ethylendiamine, 1,3-diaminopropane, N,N-bis(3-aminopropyl)-N-methylamine are reacted first with (b) epichlorohydrin in a molar ratio of from 2.0:1 to 1:1 with formation of a water-soluble cyclic amine based polymer containing primary or secondary amino groups and then with (c) ethylene oxide, propylene oxide and/or a mixture of formic acid and formaldehyde to convert more than 95% of the primary and secondary amino groups into tertiary nitrogen groups. Another preferred embodiment of the invention is a single-stage process wherein (a) imidazole is reacted with a mixture of (b) epichlorohydrin and the triglycidyl ether of trimethylol of with a mixture of epichlorohydrin and the triglycidyl ether of pentaerythritol.

The process of the invention gives cyclic amine based polymers which are substantially free of aliphatic primary, secondary and quaternary amino or ammonium groups. The content of quaternary ammonium groups in the said polymers obtained by alkylation with component (c) does not exceed 20 mol % and is usually below 10 mol %. Cyclic amine based polymers free of aliphatic quaternary ammonium groups are most preferred. The content of primary, secondary and tertiary amino groups and quaternary ammonium groups in the polymers can be determined by several methods, e.g. 13C-NMR spectroscopy, :1H-NMR spectroscopy, infrared spectroscopy, polyelectrolyte titration and potentiometric titration.

The cyclic amine based polymers which are substantially free of primary and secondary amino groups and preferably free of aliphatic quaternary ammonium groups can be used as additives in detergents in an amount of from 0.1 to 5% by weight. Laundering treating of fabrics and textiles in aqueous washing or treating solutions which contain an effective amount of the cyclic amine based polymer of the invention, followed by rinsing and drying, imparts fabric appearance benefits to the fabric and textile articles so treated. Such benefits can include improved overall appearance, pill/fuzz reduction, antifading, improved abrasion resistance, and/or enhanced softness.

The percentages in the Examples are by weight. The K values were determined according to Fikentscher, Cellulose-Chemie Vol. 13, 58–64 and 71–74 (1932) in 5% strength aqueous solution of sodium chloride, a polymer concentration of 1% by weight and at a temperature of 25° C.

The molecular weights were measured by gel permeation chromatography (GPC) using the following combination of separating columns:
(1) Waters Ultrahydrogel 500
(2) Waters Ultrahydrogel 250
(3) Waters Ultrahydrogel 250
(4) Waters Ultrahydrogel 120.

The temperature of the columns was 35° C. The eluant consisted of a mixture of a 0.2 molar acetic acid and a 0.3 molar aqueous potassium chloride solution, the flow rate was 0.5 ml/min. The calibration was carried out with narrowly distributed standards of pullulan obtained from Polymer Laboratories LTD with molecular weights M=5,800 to 853,000 and maltohexose (M=992), saccharose (M=342) and glucose (M=180). Differential refractometer ERC 7510 (ERMA) was used as detector.

EXAMPLE 1

(a) Reaction of bis(aminopropyl)piperazine with epichlorohydrin in a molar ratio of 2:1

600 g (3 moles) of bis(aminopropyl)piperazine were dissolved in 750 g of water. This solution was heated to 90° C. As soon as this temperature was reached 140.1 g (1.5 moles) of epichlorohydrin were added within 60 minutes at 90° C. The reaction mixture was then stirred at 90° C. for 150 minutes. Thereafter no epichlorohydrin could be detected. The condensation product contained NH groups.

(b) Permethylation of the condensation product obtained under (a)

99.7 g (content of NH groups was 0.87 moles) of the condensation product obtained according to (a) were mixed with 100.3 g (2.18 moles) of formic acid (99%) with stirring and cooling in an ice bath. 104.5 g (1.045 moles) of formaldehyde in the form of a 30% strength by weight aqueous solution were added in the course of 20 minutes at room temperature. The reaction mixture was then cautiously heated to 60° C. At about 50° C. the evolution of carbon dioxide from the reaction mixture began and became vigorous at 60° C. so that the heating could be removed. After the evolution of carbon dioxide had slowed down the reaction mixture was refluxed for 12 hours. After cooling 100 ml of concentrated hydrochloric acid were added and the water removed from the reaction mixture. 153.6 g of of solids were obtained and dissolved in water forming a 50% strength by weight solution of a cyclic amine based polymer substantially free of primary and secondary amino groups. As determined by 13C-NMR spectroscopy, more than 90% of the NH groups were converted into tertiary nitrogen atoms. The amount of quaternary ammonium groups an the polymer was below 5%. The aqueous polymer solution had a pH of 9.58. The k value of the polymer was 8.6.

EXAMPLE 2

(a) As described in Example 1 (a), 400 g (2 moles) of bis(aminopropyl)piperazine were dissolved in 520 g of water and condensed with 124.5 g (1.33 moles) of epichlorohydrin. The molar ratio of bis(aminopropyl) piperazine to epichlorohydrin was 1.5:1.

(b) 36.5 g (content of NH groups was 0.181 moles) of the reaction product obtained according to (a) were mixed within 10 minutes with 20.8 g of formic acid (99%) with stirring and cooling in an ice bath. The reaction mixture was then heated to 70° C. As soon as this temperature was reached, 21.7 g (0.217 moles) of formaldehyde in the form of a 30% strength aqueous solution was added at 70–80° C within 36 minutes to the reaction mixture. After the addition of two drops of a defoamer the reation mixture was refluxed for 17 hours. The polymer solution was cooled to room temperature and after the addition of 100 ml of concentrated hydrochloric acid the water was removed. A cyclic amine based polymer substantially free of primary and secondary amino groups was obtained. More than 90% of te original NH groups contained in the polymer were converted into tertiary nitrogen groups. The K value of the polymer was 11.1.

EXAMPLE 3

633 g (content of NH groups was 3.75 moles) of the condensation product of bis(aminopropyl)piperazine and epichlorohydrin in the molar ratio of 2:1 obtained according Example 1 (a) were mixed while stirring with 51.0 g (0.64 moles) of a 50% strength by weight aqueous solution of sodium hydroxide. The mixture was then heated in a pressure-tight closed autoclave to a temperature of 120° C. and reacted at this temperature with 165 g (3.75 moles) of ethylene oxide which was introduced into the autoclave within 45 minutes. The pressure in the autoclave is between 2 and 8 bar. The reaction mixture is then stirred for 1 hour at 120° C. and cooled to room temperature. Non-reacted ethylene oxide is removed with a stream of nitrogen. 830.5 g of a dark-colored liquid with a water content of 39.4% was obtained. The polymer had a K value of 12.7. More than 90% of the original NH groups were converted into tertiary amine N-hydroxyethyl substituted groups. The content of quaternary ammonium groups was below 5%.

EXAMPLE 4

290.3 g (content of NH groups was 1.59 moles) of the condensation product of bis(aminopropyl)piperazine and epichlorohydrin in the molar ratio of 1.5:1 obtained according to Example 2 (a) were mixed while stirring with 29.7 g (0.37 moles) of a 50% strength by weight aqueous solution of sodium hydroxide. The mixture was then heated in a pressure-tight closed autoclave to 95° C. As soon as this temperature was reached, 70 g (1.59 moles) of ethylene oxide were introduced into the autoclave within 35 minutes at temperatures of from 95 to 111° C. and at a pressure of from 2 to 8 bar. The contents of the autoclave were then heated for 1 hour under stirring at 120° C. and cooled to room temperature. The non-reacted ethylene oxide was removed by passing a stream of nitrogen through the reaction mixture. 400 g of a dark-colored liquid having a water content of 38.3% were obtained. The polymer had a K value of 14.1. More than 90% of the original NH groups were converted into tertiary amine N-hydroxyethyl substituted groups. The polymer contained less than 5% quaternary ammonium groups.

EXAMPLE 5

136.2 g (2.0 moles) of imidazole and 6.4 g (0.04 moles of epoxide-equivalents) of pentaerythritol-triglycidylether were dissolved while stirring in 394.1 g of water and heated to 50° C. 181.3 g (1.96 moles) of epichlorohydrin were then added and the mixture stirred for 15 minutes at 50° C. and thereafter for 4 hours at 80° C. 702.8 g of a solution of a cyclic amine based polymer substantially free of primary and secondary amino groups having a pH of 7 and a water content of 58.8% was obtained. The polymer had a K value of 17.2, a molecular weight Mn=3,240 and Mw=10700. Mw/Mn=3.3.

EXAMPLE 6

According to the procedure given in Example 5, 136.2 g (2.0 moles) of imidazole, 16.2 g (0.099 moles of epoxide-equivalents) of pentaerythritol triglycidyl ether and 175.8 g (1.90 moles) of epichlorohydrin were reacted in 334.3 g of water. 638.4 g of an aqueous solution of a cyclic amine based polymer substantially free of primary and secondary amino groups having a pH of 7.3 and a water content of 49.9% was obtained. The polymer had a K value of 27.3, a molecular weight Mn=5,000, Mw=35,000 and Mw/Mn=7.3.

EXAMPLE 7

According to the procedure given in Example 5, 136.2 g (2.0 moles) of imidazole, 32.1 g (0.199 moles of epoxide-equivalents) of pentaerythritol triglycidyl ether and 166.5 g (1.80 moles) of epichlorohydrin were reacted in 355.7 g of water. 661.4 g of an aqueous solution of a cyclic amine based polymer substantially free of primary and secondary amino groups was obtained The aqeous polymer solution had a pH of 8.7 and a water content of 48.7%. The polymer had a K value of 30.3, a molecular weight Mn 3,700, Mw=10,200 and Mw/Mn=27.6.

EXAMPLE 8

According to the procedure given i: Example 5, 136.2 g (2.0 moles) of imidazole, 6.4 g (0.048 moles of epoxide-equivalents) of trimethylolpropane triglycidyl ether and 180.6 g (1.95 moles) of epichlorohydrin were reacted in 323.2 g of water. 631.8 g of an aqueous solution of a cyclic amine based polymer substantially free of primary and secondary amino groups were obtained. The aqueous solution had a pH of 7.0 and contained 49.6% of water. The polymer had a K value of 19.7. The molecular weight of the polymer was Mn=3,7000, Mw=10,100 and Mw/Mn=2.8.

EXAMPLE 9

According to the procedure given in Example 5, 136.2 g (2 moles) of imidazole, 16.2 g (0.12 moles of epoxide-equivalents) of trimethylolpropane triglycidyl ether and 173.9 g (1.88 moles) of epichlorohydrin were reacted in 326.3 g of water. 634.5 g of an aqueous solution of a cyclic amine based polymer substantially free of primary and secondary amino groups were obtained. The aqueous solution had a pH of 7.3 and contained 49.2% of water. The polymer had a K value of 20.5 and a molecular weight Mn=3,900, Mw=12,300, Mw/Mn=3.2.

EXAMPLE 10

According to the procedure given in Example 5, 136.2 g (2 moles) of imidazole, 32.4 g (0.24 moles of epoxide-equivalents) of trimethylolpropane triglycidyl ether and 162.8 g (1.76 moles) of epichlorohydrin were reacted in 331.4 g of water. 686.1 g of an aqueous solution of a cyclic amine based polymer substantially free of primary and secondary amino groups were obtained. The aqueous solution had a pH of 9.7 and contained 49.1% of water. The polymer had a K value of 18.7 and a molecular weight Mn=3,500, Mw=15,100 and Mw/Mn=4.3.

We claim:
1. A cyclic amine containing polymer substantially free of primary and secondary amino groups which is prepared by reacting:
   a) an amine selected from the group consisting of:
      i) cyclic amines having at least one nitrogen atom in the ring and at least one primary amino alkyl group bonded to the nitrogen atom of the ring, and
      ii) mixtures of cyclic amines containing at least two nitrogen atoms which react with a cross-linking agent with at least one other amine containing 1–6 nitrogen atoms which react with a cross-linking agent, with
   b) at least one cross-linker selected from the group consisting of at least one compound containing two groups which react with the primary amino group and said nitrogen atoms and mixtures of at least one compound containing two groups which react with the primary amino group and said nitrogen atoms with at least one compound containing at least three groups which react with the primary amino group and said nitrogen atoms in a molar ratio of (a):(b) of from 2.5:1 to 1:1.5 thereby forming a cyclic amine containing polymer containing primary or secondary amino groups and reacting said cyclic amine based polymer with c) an alkylating agent selected from the group consisting of epoxides, alkyl halides, arylalkyl halides, dimethyl sulfate, diethyl sulfate, mixtures of formic acid and an aldehyde, and mixtures of formic acid and a ketone, to convert more than 80% of the primary and secondary nitrogen groups into tertiary nitrogen groups.

2. A cyclic amine based polymer as claimed in claim 1, wherein (i) the cyclic amines having at least one nitrogen atom in the ring and at least one primary aminoalkyl group bonded to the nitrogen atom of the ring are selected from the group consisting of mono aminoalkyl piperazines, bis(aminoalkyl)piperazines, mono(aminoalkyl)imidazoles, aminoalkyl morpholines, aminoalkyl piperidines and aminoalkyl pyrrolidines.

3. A cyclic amine based polymer as claimed in claim 1, wherein the cyclic amines containing at least two reactive nitrogen atoms are selected from the group consisting of imidazole, C-alkyl substituted imidazoles having 1 to 25 carbon atoms in the alkyl group, imidazoline, C-alkyl substituted imidazolines having 1 to 25 carbon atoms in the alkyl group, piperazine, N-alkyl piperazines having 1 to 25 carbon atoms in the alkyl group, N,N'-dialkylpiperazines having 1 to 25 carbon atoms in the alkyl group, N-aminopropylpiperazine, N,N'-bis(aminopropyl)-piperazine, N-aminoethylpiperazine, N,N'-bis(aminoethyl)piperazine, N-aminoethylpiperidine, N-aminopropylpiperidine and benzimidazole.

4. A cyclic amine based polymer as claimed in claim 1, wherein the amines containing 1 to 6 nitrogen atoms are selected from the group consisting of linear alkyl amines having 1 to 22 carbon atoms in the alkyl group, branched alkylamines, cycloalkylamines, alkoxyamines, amino alcohols, cyclic amines containing one nitrogen atom in a ring structure, alkylenediamines, polyether diamines, and polyalkylenepolyamines containing 3 to 6 nitrogen atoms.

5. A cyclic amine based polymer as claimed in claim 1, wherein based on compounds containing two reactive is selected from the group consisting of alkylene dihalides, epihalohydrins, bis(halohydrins) of polyalkylene glycols, bis(halohydrins) of polytetrahydro-furan, bisepoxides, and mixtures thereof.

6. A cyclic amine based polyymer as claimed in claim 1, wherein the crosslinker is selected from the group consisting of C3- to C10-alkylene trihalides, reaction products of polyols having more than three hydroxy groups with epihalohydrins in a molar ratio of at least 1:3.

7. A cyclic amine based polymer as claimed in claim 1, wherein more than 90% of the primary and secondary nitrogen groups of the condensation product of (a) and (b) are converted into tertiary nitrogen groups by reacting then with (c) an alkylating agent selected from the group consisting of ethylene oxide, propylene oxide, C1- to C3- alkyl halide, dimethyl sulfate, diethyl sulfate, and a mixture of formic acid and a C1- to C3- aldehyde.

8. A cyclic am-ne based polymer as claimed in claim 1, wherein more than 90% of the primary and secondary nitrogen groups of the condensation product of (a) and (b) are converted into tertiary nitrogen groups by reacting them with (c) a mixture of formic acid and formaldehyde.

9. A cyclic amine containing polymer as claimed in claim 1, prepared by reacting:

(a) 1,4-bis(aminopropyl)piperazine or a mixture of imidazole with at least one compound selected from the group consisting of dimethylamino propylamine, hexamethylenediamine, ethylenediamine, 1,3-diaminopropane and N,N-bis(3-aminopropyl)-N-methylamine, with (b) epichlorohydrin in a molar ratio of from 2.0:1 to 1:1 thereby forming a water-soluble cyclic amine containing polymer containing primary or secondary amino groups, and (c) alkylating the said cyclic amine based polymer with ethyleneoxide, propyleneoxide and/or a mixture of formic acid and formaldehyde to convert more than 95% of the primary and secondary amino groups into tertiary nitrogen groups.

10. A cyclic amine containing polymer substantially free of primary and secondary amino groups prepared by reacting:

(a) a cyclic amine having at least two nitrogen atoms which react with a cross-linking agent, with (b) a mixture of cross-linking agents of at least one compound containing two groups which react with said nitrogen atoms with at least one compound containing at least three groups which react with said nitrogen atoms in a molar ratio of (a):(b) of from 2.5:1 to 1:1.5 thereby forming a water-soluble cyclic amine containing polymer substantially free of primary and secondary amino groups.

11. A cyclic amine based polymer as claimed in claim 10, wherein the said polymer is prepared by reacting (a) imidazole with (b) a mixture of epichlorohydin and trigylcidylether of trimethylol propane or a mixture of epichlorohydrin and trigylcidylether of pentaerythritol.

12. A process for the production of a cyclic amine containing polymer substantially free of primary and secondary groups, which comprises reacting:

(a) an amine selected from the group consisting of cyclic amines having at least one nitrogen atom in the ring and at least one primary amino alkyl group bonded to the nitrogen atom of the ring, and mixtures of cyclic amines containing at least two nitrogen atoms which react with a cross-linking agent with at least one other amine containing 1–6 nitrogen atoms, with (b) at least one cross-linker selected from the group consisting of at least one compound containing two groups which react with the primary amino group and said nitrogen atoms and mixtures of at least one compound containing two groups which react with the primary amino group and said nitrogen atoms with at least compound containing at least three groups which react with the primary amino group and said nitrogen atoms in a molar ratio of (a):(b) of from 2.5:1 to 1:1.5 thereby forming a cyclic amine containing polymer containing primary or secondary amino groups and reacting said cyclic amine containing polymer with (c) an alkylating agent selected from the group consisting of epoxides, alkyl halides, arylalkyl halides, dimethyl sulfate, diethyl sulfate, mixtures of formic acid and an aldehyde, and mixtures of formic acid and a ketone, to convert more than 80% of the primary and secondary nitrogen groups into tertiary nitrogen groups.

13. A process for the production of a cyclic amine containing polymer substantially free of primary and secondary amino groups, which comprises reacting:

(a) a cyclic amine having at least two nitrogen atoms which react with a cross-linking agent with (b) a mixture of cross-linking agents of at least one compound containing two groups which react with said nitrogen atoms with at least one compound containing at least three groups which react with said nitrogen atoms in a molar ratio of (a):(b) of from 2.5:1 to 1:1.5 thereby forming a water-soluble cyclic amine containing polymer substantially free of primary and secondary amino groups.

14. A process as claimed in claim 12, wherein more than 90% of the primary and secondary nitrogen groups of the condensation product of (a) and (b) are converted into tertiary nitrogen groups by reacting them with (c) an alkylating agent selected from the group consisting of ethylene oxide, propylene oxide, C1- to C3- alkyl halide, dimethyl sulfate, diethyl sulfate, and a mixture of formic acid and a C1- to C3- aldehyde.

15. A process as claimed in claim 12, which comprises reacting (a) 1,4-bis(aminopropyl)piperazine or a mixture of imidazole with at least one compound selected from the group consisting of dimethylamino propylamine, hexamethylenediamine, ethylendiamine, 1,3-diaminopropane and and N,N-bis(3-aminopropyl)-N-methylamine with (b) epichlorohydrin in a molar ratio of from 2.0:1 to 1:1 thereby forming a water-soluble cyclic amine containing polymer containing primary or secondary amino groups and (c) alkylating the said cyclic amine based polymer with ethyleneoxide, propyleneoxide and/or a mixture of formic acid and formaldehyde to convert more than 95% of the primary and secondary amino groups into tertiary nitrogen groups.

16. A process as claimed in claim 13, which comprises reacting (a) imidazole with (b) a mixture of epichlorohydin and triglycidylether of trimethylol propane or a mixture of epichlorohydin and triglycidylether of pentaerythritol.

* * * * *